(12) United States Patent
Peura et al.

(10) Patent No.: US 9,120,374 B2
(45) Date of Patent: Sep. 1, 2015

(54) PTU CANTILEVER RING GEAR DISCONNECT

(75) Inventors: Brent Michael Peura, Farmington, MI (US); Robert Genway-Haden, Rochester, MI (US); Hiromichi Fukuda, Tochigi (JP)

(73) Assignee: GKN Driveline North America, Inc., Auburn Hills, MI (US)

( * ) Notice: Subject to any disclaimer, the term of this patent is extended or adjusted under 35 U.S.C. 154(b) by 533 days.

(21) Appl. No.: 13/398,236

(22) Filed: Feb. 16, 2012

(65) Prior Publication Data

US 2012/0204664 A1 Aug. 16, 2012

Related U.S. Application Data

(60) Provisional application No. 61/443,456, filed on Feb. 16, 2011.

(51) Int. Cl.
*B60K 17/344* (2006.01)

(52) U.S. Cl.
CPC ......... *B60K 17/344* (2013.01); *Y10T 29/49464* (2015.01); *Y10T 74/19614* (2015.01)

(58) Field of Classification Search
CPC ............................. B60K 17/34; B60K 17/344
USPC ................... 180/233, 247, 248; 384/247, 249
See application file for complete search history.

(56) References Cited

U.S. PATENT DOCUMENTS

| 4,601,359 | A | * | 7/1986 | Weismann et al. | 180/233 |
|---|---|---|---|---|---|
| 5,094,655 | A | * | 3/1992 | Sato | 475/198 |
| 5,795,037 | A | * | 8/1998 | Hagelthorn | 301/124.1 |
| 6,422,967 | B1 | * | 7/2002 | Krisher | 475/230 |
| 6,605,018 | B2 | | 8/2003 | Palazzolo | |
| 6,902,017 | B2 | * | 6/2005 | Ohashi | 180/53.6 |
| 6,938,517 | B2 | | 9/2005 | Cook et al. | |
| 7,004,874 | B2 | | 2/2006 | Mizon et al. | |
| 7,127,967 | B2 | | 10/2006 | Cook et al. | |
| 7,140,268 | B2 | | 11/2006 | Leposky et al. | |
| 7,150,694 | B2 | | 12/2006 | Mizon et al. | |
| 7,155,827 | B2 | * | 1/2007 | Stuart et al. | 29/898.09 |
| 7,717,525 | B2 | * | 5/2010 | White et al. | 301/111.03 |
| 8,132,638 | B2 | | 3/2012 | Martus et al. | |
| 8,720,633 | B2 | * | 5/2014 | Grutter et al. | 180/248 |
| 2008/0230295 | A1 | | 9/2008 | Grogg | |
| 2010/0058890 | A1 | | 3/2010 | Palazzolo et al. | |
| 2011/0308875 | A1 | * | 12/2011 | Marsh et al. | 180/248 |

* cited by examiner

*Primary Examiner* — Anne Marie Boehler
(74) *Attorney, Agent, or Firm* — Jennifer M. Brumbaugh; Reising Ethington P.C.

(57) ABSTRACT

A power transfer unit assembly for a vehicle. The power transfer unit includes a cantilevered ring gear assembly configured on a housing cover. The housing cover is configured to mate to a main housing that may be configured in a vehicle drivetrain. The power transfer unit may include at least one engagement mechanism configured to selectively engage and disengage the cantilevered ring gear assembly.

16 Claims, 8 Drawing Sheets

PTU CANTILEVER RING GEAR DISCONNECT

CROSS-REFERENCE TO RELATED APPLICATIONS

This application claims priority to U.S. Provisional Patent Application 61/443,456 filed on Feb. 16, 2011, the contents of which are hereby incorporated by reference in its entirety.

TECHNICAL FIELD

The disclosure generally relates to power transfer units and more particularly to power transfer units having a disconnect mechanism for disengaging rotating components.

BACKGROUND

Fuel efficiency and component package envelopes are becoming a driving force in the design of vehicle drivelines. Specifically, designers are challenged by the need to provide the all-wheel drive capabilities of larger sport utility vehicles (SUVs) in smaller more compact vehicles to achieve better fuel efficiency while maintaining traction capabilities. Motor vehicles may be driven by a transmission that transmits rotational torque from a power head, such as an engine, to a power transfer unit (also known as a power take-off unit) through a torque-transmitting shaft. The power transfer unit ultimately drives a plurality of axles that can be divided into those with a hang-on four-wheel drive, wherein a primary axle is driven permanently and a secondary axle is connected, if required, and those with a permanent four-wheel drive or all-wheel drive, wherein all axles are driven permanently as drive torque is split between all wheels. The design of the driveline is largely influenced by the arrangement of the engine in the motor vehicle, i.e. whether it is arranged in the front or at the rear and whether it is positioned in the longitudinal or transverse direction. At the same time, stringent packaging requirements exist regarding size, weight, and assembly costs of such systems.

Power transfer units are commonly utilized in front-wheel drive based all-wheel drive systems. A power transfer unit transmits the torque from the transmission to a propshaft, which in turn delivers power to the rear wheels. Most power transfer units are always in a ready state, commonly controlled by a slipping clutch near the rear axle, and yet are utilized only a small fraction of the time during driving. However, in this "ready state", the existing power transfer units exhibit a full time drain to fuel efficiency with only a part-time benefit to traction.

In typical four-wheel or all-wheel drive based layouts, the power transfer unit is always rotating when the vehicle is in motion, creating energy losses due to gear mesh, rotating inertias, bearing drag, as well as oil churning. These losses reduce the fuel economy and may create premature wear on the rotating assembly. Additionally, typical power transfer units are bulky and include rotating components that were originally configured for larger vehicles, which prohibit interchangeability in smaller motor vehicles. Thus, there exists a need for a power transfer unit that minimizes the energy losses to increase fuel efficiency while maintaining a small package envelope for use in various motor vehicle platforms.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

DETAILED DESCRIPTION

Exemplary arrangements of a power transfer unit having a cantilever supported ring gear assembly that packages a mechanical locking clutch or synchronizer in front of a pinion gear are disclosed. In an exemplary arrangement, a shift collar connects a power transfer unit input shaft to the clutch or synchronizer as well as the ring gear assembly when fully engaged. Ball detents may be used on the shift collar to engage a block out ring of the synchronizer when engaging the input shaft with the ring gear assembly to engage the power transfer unit. Splines may be used on the synchronizer cones to permit optimal packaging size and larger synchronizer cones. Placement of the synchronizer using splines and locking fingers into the mating components, as well as using an internal sliding sleeve allows for a larger synchronizer to be placed to allow optimal packaging and larger synchronizer cones with larger friction material.

The present disclosure provides at least one power transfer unit (PTU) having a cantilevered ring gear and a ring gear disconnecting assembly in a vehicle driveline. The PTU is compact such that the housing and internal components may be interchanged between various vehicle layouts, which require a tight package envelope, as well as, improved fuel efficiency. In one arrangement, the PTU may be rotatively connected at one end to a transmission and to a differential unit assembly at the rear of the vehicle through a propeller shaft connected at a PTU assembly output end.

However, the PTU is not limited to a single arrangement and may be configured as a primary PTU that is rotatively engaged with the transmission at the front of the vehicle, as a secondary PTU or rear drive unit (RDU) is configured at the rear of the vehicle, or a combination of both. When used as a secondary PTU, the primary PTU drives the secondary PTU through a propeller shaft extending from output end and is received at an input end of the secondary PTU. The primary and secondary PTU's may include similar internal components configured in different housings. Additionally, the PTU may be used with various vehicle power head layouts, such as, but not limited to an engine being transversely mounted for front wheel drive vehicles and longitudinally for rear wheel drive vehicles. Merely by way of example and for simplicity, the primary PTU configured with the transversely mounted power head and transmission will be discussed in greater detail below. It should be known that a differential unit may be configured between the transmission and the PTU. The term transmission output is a universal term that includes an output shaft extending from the transmission or from the transmission differential to transmit torque to the PTU, which may be connected directly to an output section of the transmission. The transmission output shaft provides torque to the PTU, as well as, torque to the two front wheels by extending through the PTU to engage the front right shaft while the front left shaft typically extends into a drive element in the transmission/differential.

The PTU includes an outer housing having an engagement end and at least one output end. The housing may be sectioned into two parts, a main housing and a cover, for ease of assembly. However, other housing configurations may be contemplated depending on the use and location, and the housing is not limited to a specific number of housing parts. A ring may be preassembled on the cover with the ability to shim only the cover side relative to the housing. Thus, by shimming a single side, a ring cartridge eliminates the need to shim two sets of bearings to adjust both a bearing preload and a ring gear mounting distance (mesh). A final rotating assembly, which includes the ring cartridge, is configured within the housing and is rotatively connected with an output shaft of the transmission. The transmission output shaft engages a PTU input shaft to drive at least one wheel assembly to propel the vehicle. The transmission output shaft or transmission differential output shaft may extend through the PTU to drive at least one wheel while the PTU is disengaged.

The rotating assembly may include a PTU input shaft that transmits torque from the transmission to the PTU; the input shaft is rotationally fixed with the transmission output. A shift locking ring connects the PTU input shaft to the ring gear when engaged. A PTU pinion gear is used to transmit the input torque from a ring gear to a PTU output shaft. An actuator provides rotation, either mechanically or electromechanically to an actuator shift rod. The actuator shift rod may be supported axially in the housing by an actuator shaft bearing, and the actuator shift rod supports a shift fork and provides an axial screw for shift rod movement. An actuator nut hat is included with the actuator to rotationally fix an actuator nut and provide an axial reaction surface. The actuator may also include an actuator fork spring, which provides axial force to the shift fork under multiple modes of the actuator and allows for movement of the actuator screw net during a binding (torque trap) and/or block out conditions during engagement and/or disengagement of the PTU. The binding condition may be present when engaging/disengaging the PTU when torque is being applied to the system, while block out is a condition where the PTU is blocked from engagement due to misalignment of the splines, which typically may happen when the vehicle is not moving. Upon movement, the components will index, allowing the fork spring to force the engagement.

In operation, the PTU may receive an automatic or manual activation signal to engage or disengage the PTU. The automatic signal may be received from sensors that detect changes in wheel spin or RPM, while the manual activation may come in the form of an activation button or shift lever, depending on the application. The sensors may include, but are not limited to, a throttle position sensor, a wheel spin sensor, a rev limiting sensor or other similar sensor configured in the vehicle. The use of the activation button is similar to the automatic in that depressing the button sends a signal to engage or disengage, just as the signal would be received from the sensors. The shift lever is typically a mechanical system, in that the lever is connected to a linkage that is directly connected to the PTU to shift the actuator manually.

Additionally, a combination of the automatic or manual activation signal may also be used where a shift lever engages an electronic switch to send the signal to the actuator. Regardless of which shift mechanism is utilized, once the actuator gets the indication to shift, it moves the shift fork to an engagement position to engage the PTU when a decreased traction condition occurs to provide all-wheel or four-wheel drive, thereby allowing all four tires to engage a vehicle path. Then, when traction is continuous, a signal may be sent to the actuator to move the shift fork to a disengaged position.

The actuator may be a dual-action actuator or a single-action actuator. The dual-action actuator requires two separate signals to move the actuator in both engaged and disengaged positions. The single-action actuator may be normally engaged or disengaged and may require the use of an additional mechanical means for engaging the other position, the mechanical means may be in the form of a return spring. The single-action actuator requires a continuous single signal to move the actuator into the engaged or disengaged position. It should be realized that the PTU may include a PTU controller that receives the signal from the sensors and controls the actuator for engaging or disengaging the PTU.

Once the PTU is engaged, it transmits the torque to the secondary PTU, which is also known as a rear drive unit (RDU). The RDU may be similarly configured with the ability to selectively engage or disengage the unit depending on the application, as discussed above and in further detail below.

A method of assembly may be utilized that includes assembling a separate ring cartridge that has a final preload set on a ring gear bearing. The separate ring cartridge may include the ring gear affixed to a ring gear shaft, at least one bearing, at least one shim, a ring gear axial fastener, at least one seal and the cover. The axial fastener may be a nut, snap-ring or other known fastener. The ring gear is finished machined to include, but not limited to, cartridge bearing seats and/or bearing races to provide a bearing preload when clamped on a ring gear shaft by a nut. The cartridge may include insensitivity to reasonable nut torque as the final preload is obtained when the cartridge is bolted to the main housing. The ring gear nut may be configured at an input side of the cartridge adjacent the ring gear or at the output side adjacent the bearing.

The exemplary arrangement provides selective engagement and disengagement of the PTU while providing a more compact unit that is applicable to a wider range of vehicles for improved fuel economy. Furthermore, it is contemplated that the preassembled ring cartridge that includes a ring gear cantilevered within the cartridge is unique.

Figure 1:
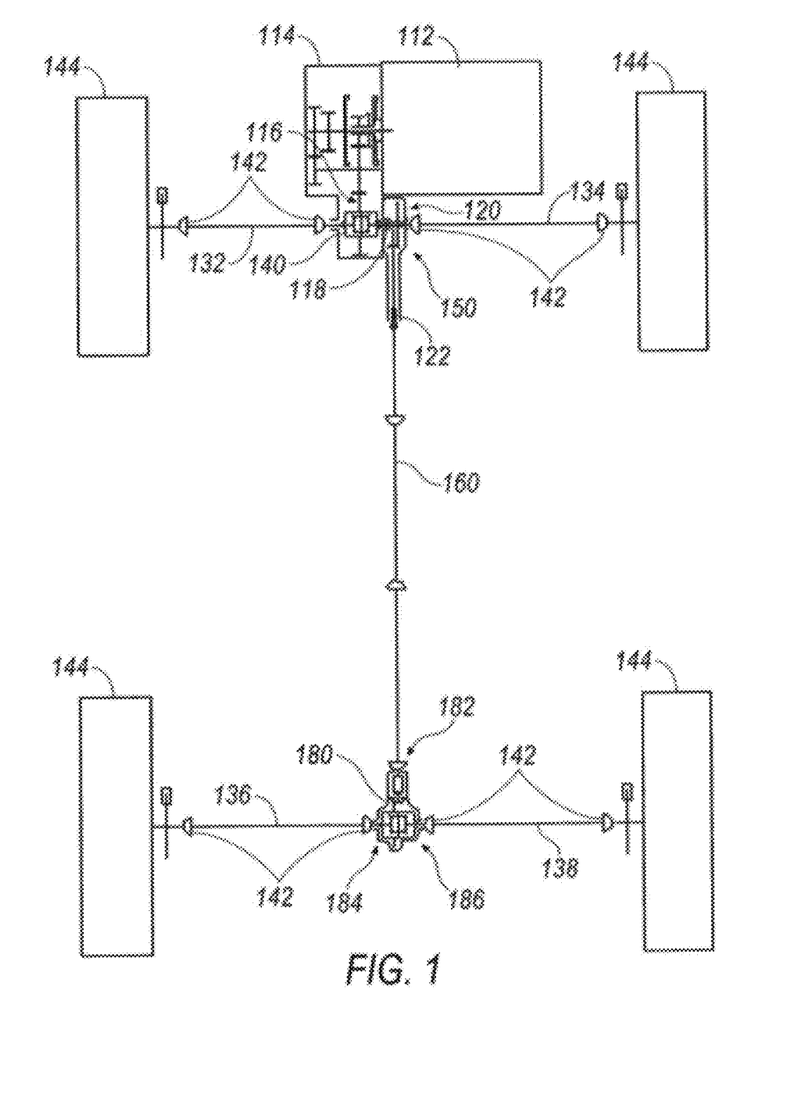
FIG. 1 illustrates a top view of a vehicle drivetrain having an exemplary primary power transfer unit and an exemplary secondary power transfer unit/rear drive unit according to one exemplary arrangement.

Referring now to FIG. 1, an exemplary vehicle drivetrain assembly 100 is illustrated. The vehicle drivetrain assembly 100 has a transversely mounted engine 112 and transmission 114. The vehicle drivetrain assembly 100 may include a plurality of shaft elements 132, 134, 136, 138 and corresponding articulating torque transfer joints, which are illustrated as a constant velocity joints 142. However, other types of joints may be used, such as, but not limited to universal, tripod, cardan, double cardan and plunging constant velocity joints. The shaft elements 132, 134, 136, 138 and joints 142 may be used to transmit torque from both a primary power transfer unit (PTU) 150 and a transmission 114 to a plurality of wheels 144. Generally, the engine 112 may be affixed to a transmission 114 through an engine crankshaft (not shown) that is fixed to a transmission input shaft (not shown) to provide torque to the transmission 114. The torque may be transmitted through a series of gears (not shown), within the transmission 114, and ultimately to a transmission output shaft 116 that may be at a parallel offset from the transmission input shaft. At the transmission output, the transmission 114 may be affixed directly to the PTU 150 or a differential 140 may be utilized between the transmission 114 and the PTU 150, depending on the position of the transmission 114. The PTU 150 may be rotatively connected to the transmission output shaft 116 through an input shaft 118 (best seen in FIG. 3). The first front shaft 132 is generally configured extending from the transmission 114, which may include the differential 140 or it may be positioned within the input shaft 118 to extend exteriorly from one end of the PTU 150, and a second front shaft 134 may extend from an opposite end at a front output side 120 of the power transfer unit 150. Additionally, the primary PTU 150 may include an output 122 to transmit torque to a secondary PTU or rear drive unit (RDU) 180 to drive the rear wheels 144 through a propeller shaft 160.

The RDU 180 may be configured similarly to the PTU 150 including an input 182, a first output 184 configured to transmit torque to a wheel 144 through a first rear shaft 136, and a second output 186 configured to transmit torque to a wheel 144 through a second rear shaft 138.

Figure 2:
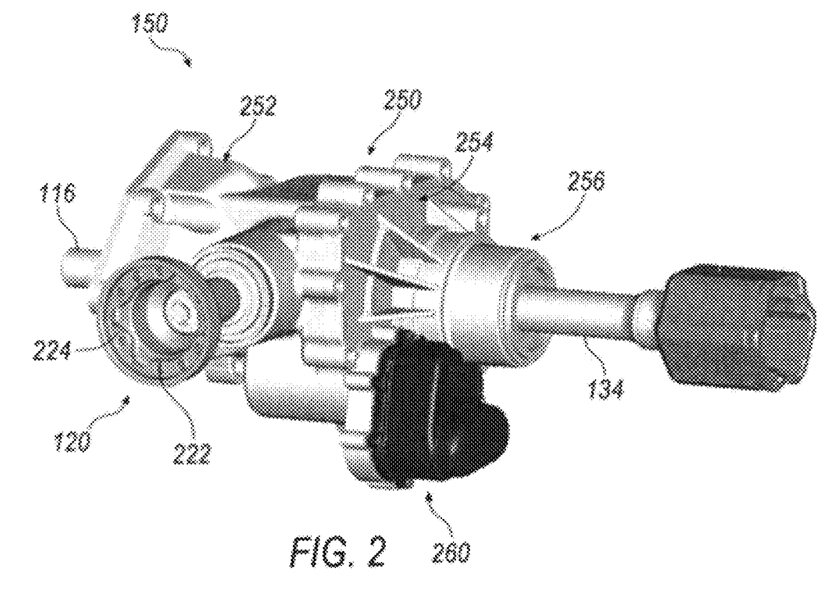
FIG. 2 illustrates an exemplary power transfer unit with a cantilevered ring cartridge.

Referring to FIG. 2, an exemplary PTU 150 is illustrated. The PTU 150 may include a housing 250 having a main housing 252 and a cover 254. However, it should be known that the housing 250 may be sectioned into multiple pieces and is not limited to the exemplary two-piece configuration of the main housing 252 and the cover 254. The housing may be constructed from rigid materials, such as, but not limited to aluminum, steel, iron, carbon fiber or other known composites and metal matrices. The main housing 252 is configured to be rotatively fixed and connect to the transmission 114 housing, while the cover 254 is configured as a cantilevered ring gear cartridge assembly 256 that is affixed to the main housing 252. The cover 254 may include an actuator 260 that is assembled with the ring gear cartridge assembly 256. The exterior surfaces of the housing 250 are configured to provide minimal clearance between the PTU 150 and the engine 112, thereby creating a tight driveline package envelope. The minimal clearance is a result of the existing engine and transmission designs, which result in minimal clearance. The PTU 150 includes an output shaft 222 having a connection element 224, such as, but not limited to a yoke or other driveline connection element. The connection element 224 is configured to rotatively connect the propeller shaft 160 directly to the PTU 150 for transmitting torque to the RDU 180.

Figure 3:
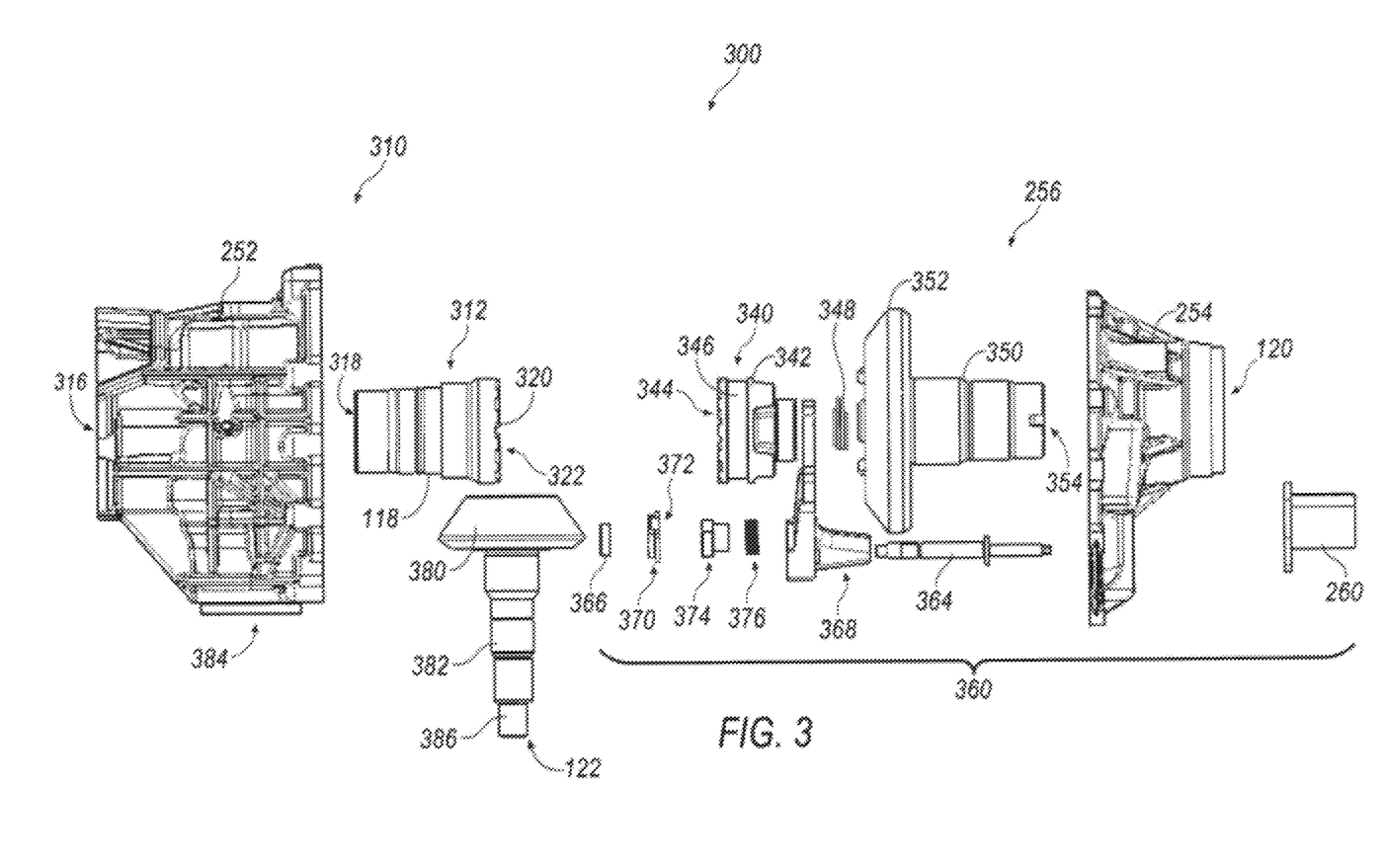
FIG. 3 illustrates an exploded view of an exemplary power transfer unit assembly.

Turning to FIG. 3, and exemplary PTU 150 rotating assembly 300 is illustrated in a partial exploded view. The rotating assembly 300 includes the ring gear cartridge assembly 256, 360 configured with the cover 254 and a main housing assembly 310 configured within the main housing 252. Main housing assembly 310 may include the input shaft 118, which is supported by at least one bearing 312 in the main housing 252, and a seal (not shown) is configured at a housing input side 316 to prevent fluids from escaping and contaminants from entering an internal space of the PTU 150. As discussed above, the output shaft 116 of the transmission 114 is rotatively fixed to the input shaft 118 of the PTU 150. The shaft 118 may be configured with splines, cogs or other torque transmitting connection elements to rotatively fix and slidingly mate to the output shaft 116 at an input side 318 of the input shaft 118. The input shaft 118 may also include a locking element 320, such as, but not limited to a face spline, configured on an opposing output end 322. The locking element 320 is configured to engage at least one of a clutch mechanism 340 or synchronizing mechanism 540 (illustrated in FIG. 5), which may be configured between the input shaft 118 and a cantilevered ring gear shaft 350, prior to final assembly.

The clutch mechanism 340 may include a sleeve or shift locking ring 342 that is configured between the output end 322 of the input shaft 118 and the cantilevered ring gear shaft 350 to selectively transmit torque from the transmission 114 to the PTU output 122. The clutch mechanism 340 is configured to transmit the torque from the input shaft 118 to the rotating components of the ring gear cartridge assembly 256 and ultimately to the PTU output 122, which is configured within the main housing 252. The clutch mechanism 340 may be configured with face splines 344 that mate with corresponding splines 320 on the input shaft 118. A similar spline 344 may be configured on the opposing end of the clutch mechanism 340 for engagement with at least one of a ring gear 352 and the cantilevered ring gear shaft 350. The clutch mechanism 340 face splines 344 may be configured to engage the PTU 150 at an approximate 0-200 RPM delta, depending on the load associated with the torque.

The ring gear cartridge assembly 256 may include the cantilevered ring gear 352 configured on the cantilevered ring gear shaft 350. It should be known that the cantilevered ring gear 352 and the cantilevered ring gear shaft 350 are forged into a single unit and machined as one unit. However, it is contemplated that the ring gear 352 may be affixed to the cantilevered ring gear shaft 350 by welding, fastening or other known method such that the two function as single cantilever unit. The cantilevered ring gear shaft 350 is supported in the cover 254 by at least one bearing 410 (illustrated in FIG. 4) and is secured axially by at least one axial fastener 354, such as, but not limited to a nut, snap ring or other known fastener. Ring gear cartridge assembly 256 is configured such that a bearing preload and a ring gear mounting distance (mesh) may be set prior to final assembly with the main housing 252. This preload/mesh is achieved by placing at least one shim 414 (illustrated in FIG. 4) in the housing cover 254 of the PTU 150, which axially secures the cantilevered ring gear shaft 350 and attached ring gear 352 relative to the main housing 252. Typically, at least two bearings 410, 432 are shimmed to adjust both bearing preload and ring gear mounting distance (mesh). When setting the preload, shims 414 may be placed behind the bearing 410 and a crush sleeve 430 is used to increase the resolution of the nut to bearing clamp load. The crush sleeve 430 may also provide resistance to the nut torque in a given axial torque range allowing a more accurate clamp setting when the main housing 252 and cover 254 are clamped together. The crush sleeve 430 may also be replaced with a non-crushing sleeve and a combination of shimming, measuring or matched machining of multiple locations 414, 416 and 472 may be used to set an axial length. The nut 412 may be configured at either end of the cantilevered ring gear shaft 350, depending on the application.

An actuator assembly 360 may also be configured within the ring gear cartridge assembly 256. The actuator assembly 360 may include an actuator 260 that provides rotation, either mechanically or electromechanically to an actuator shift rod 364. The actuator shift rod 364 may be supported axially in the cover 254 by an actuator shaft bearing 366. The actuator shift rod 364 may support a shift fork 368 and may provide axial movement to the shift rod 364. The shift fork 368 is configured to engage a shift groove 346 configured on an outer surface of the shift locking ring 342. The axial movement from the shift fork 368 on the shift rod 364 may be in the form of a screw gear or cylinder, depending on the application. An actuator nut hat 370 is included with the actuator shift rod 364 to rotationally fix the actuator nut 370 and provide an axial reaction surface 372. The actuator 260 may also include an actuator screw nut 374 for providing and axial force to an actuator fork spring 376. The actuator fork spring 376 provides axial force to the shift fork 368 under multiple modes of the actuator and allows for movement of the actuator screw nut 374 during a binding (torque trap) and/or block out condition during engagement and/or disengagement of the PTU. The binding condition may be present when engaging/disengaging the PTU and when torque is being applied to the system, while block out is a condition where the PTU is blocked from engagement due to misalignment of the splines (discussed in greater detail below). This typically may happen when the vehicle is not moving, and upon movement, the components will index, allowing the fork spring 376 to force the engagement.

As discussed above, when the clutch 340 in the engaged position, torque enters at the input shaft 118 and is transferred through the engaged clutch 340 and into the cantilevered ring gear 352. Rotation of the cantilevered ring gear 352 transfers and converts a transverse torque into a longitudinal torque through a pinion gear 380. The pinion gear 380 is formed as a single unit with a pinion shaft 382, which makes up the PTU output 122. The pinion shaft 382 is supported in the main housing 252 by at least one bearing (not illustrated), and a seal (not illustrated) is configured in a pinion shaft housing opening 384 to prevent the ingress of contaminants or the egress of fluids. Additionally, a pinion yoke 710 may be configured at an output side 386 of the pinion shaft 382 for connection with the propeller shaft 160.

Disengagement of the clutch 340 allows the cantilevered ring gear 352, cantilevered ring gear shaft 350, the pinion gear 380, pinion shaft 38 and clutch mechanism 340 to stop spinning, thereby eliminating additional drag on the system. Thus, rotation of the front wheels 144 is a result of the transmission output shaft 116, which extends through the PTU 150 and engages the front shafts 132, 134. As discussed above, the input shaft 118 is rotationally fixed to the transmission output shaft 116, so the input shaft 118 will continue to rotate, thereby creating a minimum amount of drag or oil churn. Thus, because the input shaft 118 is the only element within the PTU 150 that spins, fuel efficiency is increased. Additionally, a spring 348 may be included to apply pressure to push the locking ring 342 into engagement in all-wheel drive, as well as during the blockout condition described above. Thus, when the PTU is engaged by the shift fork 368 placing the PTU in all-wheel drive the locking ring 342 bottoms out on the input shaft 116. A clearance is configured between the shift fork 368 and the locking ring groove 346 so that the shift fork 368 does not prematurely wear, thereby allowing the use of a lower cost component material. Another function is that the shift fork 368 does not see a shock load when the input shaft 116 and the locking ring 342 are indexing.

Figure 4:
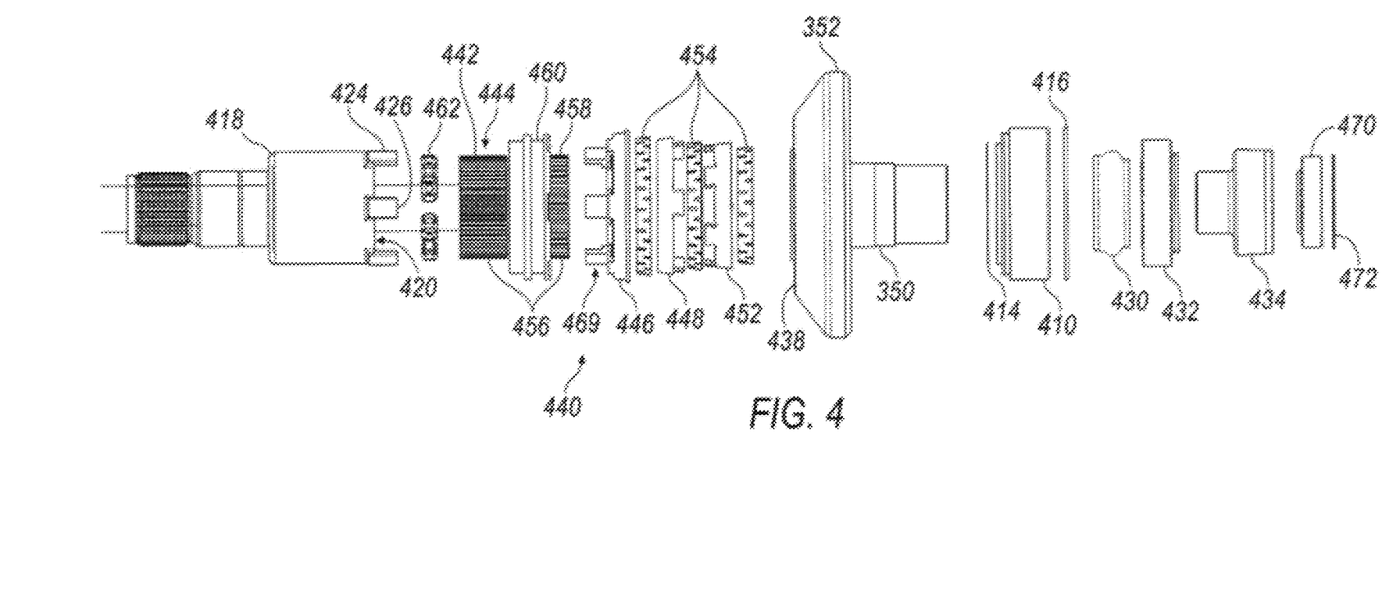
FIG. 4 illustrates an exploded view of a synchronized cantilever power transfer unit.

FIG. 4 illustrates an exploded view of the transverse rotating components. Specifically, FIG. 4 illustrates an exemplary PTU 450 utilizing the synchronizing mechanism 440 as well as additional detail of the components for axially retaining the cantilevered ring gear 352, thereby creating the cantilever ring gear cartridge assembly 256. The transverse rotating components may include the input shaft 418, the synchronizer mechanism 440, the cantilevered ring gear shaft 350 with cantilevered ring gear 352 and associated components. As illustrated, the input shaft 418 is a hollow shaft configured to receive the transmission output shaft 116. The input shaft 418 is supported in the main housing 252 by at least one bearing (not illustrated) and a second end 420 is configured to extend around a first end 442 of a synchronizer collar 444. Additionally, the input shaft 418 may be configured with inner diameter (I.D.) splines 522 and face splines 424 configured on an input shaft end face 426 for rotationally fixing the input shaft 418 to the synchronizing mechanism 440.

The synchronizing mechanism 440 may include the synchronizer collar 444, an outer shift cone blockout ring 446, an inner shift cone 448, which may be rotationally fixed to the cantilevered ring gear 352, and a blockout ring cone 452 selectively engaged with the inner shift cone 448 to transmit torque from the input shaft 418 to the cantilevered ring gear 352. A plurality of shift cone friction material 454 may be configured between each of the three cones 446, 448 and 452. The synchronizer collar 444 may be configured with splines 456 on the first end 442 that correspond with the splines 522 on the input shaft 418. Additionally, the splines 456 may be configured on a second end 458 for engagement with splines configured on an inside diameter of the outer shift cone blockout ring 446 and splines 552 configured in a recess face 438 of the cantilevered ring gear 352. The synchronizer collar 444 may also include a circumferential shift fork groove 460. The shift fork groove 460 may be configured to receive the shift fork 368 for selectively engaging the synchronizing mechanism 440 through axial movement.

The synchronizing mechanism 440 may also include detents 462 configured circumferentially about the synchronizer collar 444. In one exemplary arrangement, the detents 462 are configured as spring-loaded balls that provide a force for the blockout ring synchronization. Specifically, the detent 462 may be displaced when the synchronizer collar 444 is shifted axially to engage/disengage the PTU 150, 450. The movement of the synchronizer collar 444 pushes the outer shift cone blockout ring 446 and cones 448 and 452 into engagement. Thus, a normal force is provided to a friction surface of the shift cone friction material 454 to equalize the speed of the cantilevered ring gear 352 with the speed of the input shaft 418 to allow engagement of the two components.

FIG. 4 also provides additional detail to the components that may be utilized to provide preload to the ring gear bearings 410 and allow the ring gear 352 and ring gear shaft 350 to be cantilevered from the housing cover 254. Specifically, the cantilevered ring gear 352 and the cantilevered ring gear shaft 350 are supported in the housing cover 254 through the use of at least one bearing element 410 that may be slid over the cantilevered ring gear shaft 350 to a predetermined position. A shim 414 may be configured on the end surface of the bearing 410 to provide the appropriate meshing distance for gear alignment with the pinion gear 380. Additionally, a bearing cup 416, which may function as a shim, may be positioned adjacent and opposite end surface of the bearing 410 to provide a wall for positioning a crush sleeve 430. A second bearing 432 may be used and is positioned on the opposing side of the crush sleeve 430. A hollow ring bearing nut 434, which is similar to nut 354, is configured adjacent the second bearing 432. The ring bearing nut 434 configured with threads 534 on an outside diameter 532 and is threaded into an end of the hollow cantilevered ring gear shaft 350. The ring bearing nut 434 is tightened to set the preload and lock the components to the cover housing 254, thereby forming a main portion of the cantilevered ring gear cartridge assembly 256.

Additionally, a front shaft bearing 470 may be configured in a cupped end 536 of the ring bearing nut 434. A snap ring 472 or other known retaining element may be used to secure the front shaft bearing 470 in place within the cupped end 536. The front shaft bearing 470 may be used to support an end of the output shaft 116 or an end of the second front shaft 134 to transmit torque to the wheel 144.

Figure 5:
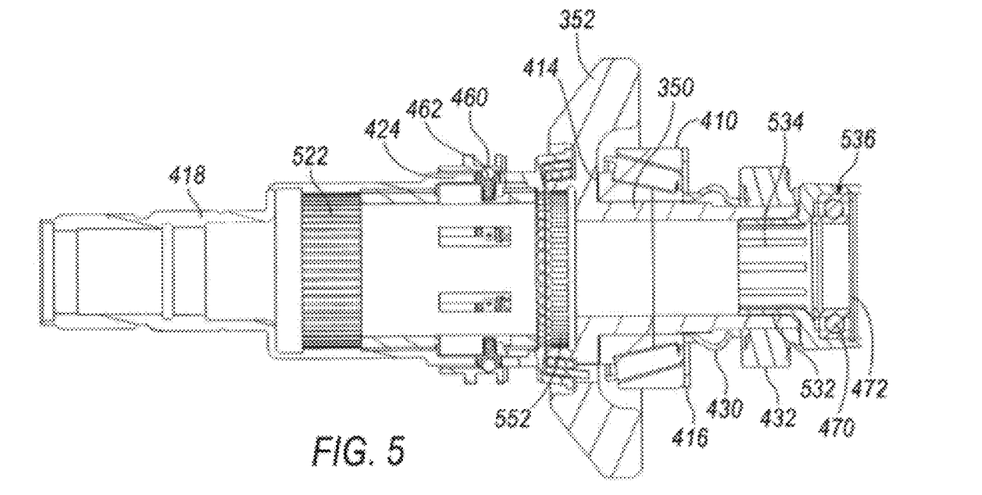
FIG. 5 illustrates a section view of a synchronized cantilever power transfer unit in a disconnected two wheel drive mode.
Figure 6:
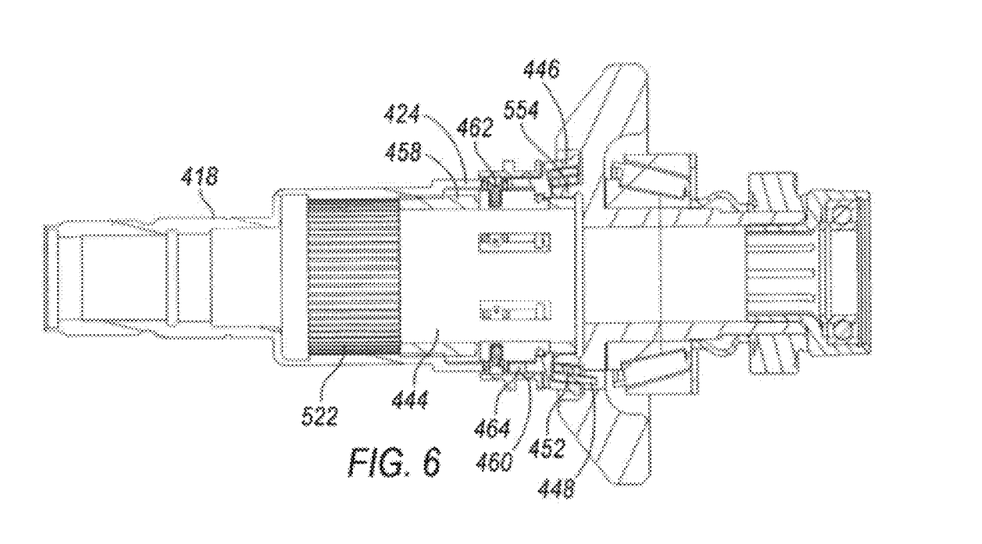
FIG. 6 illustrates a section view of a synchronized cantilever power transfer unit in a connected all wheel drive/four wheel drive mode.

FIGS. 5 and 6 illustrate the exemplary synchronizing mechanism 440 in the disengaged (FIG. 5) position and the engaged (FIG. 6) position. In the disengaged position, the synchronizer collar 444 is slid in the opposite direction of the cantilevered ring gear 352. This position prevents the ring gear and ultimately the pinion from rotating. In FIG. 5, the splines 552 are configured in the recess face 438 of the cantilevered ring gear 352. Additionally, a reaction face 554 is configured in the recess face 438. The reaction face 554 is angled to provide increased engagement with the cones 446, 448, 452, thereby creating an increased clamping force on the friction material 454. The friction material allows the two rotating speeds to normalize at an even rate, thereby allowing the synchronizer ring to engage the ring gear splines 552 at a much higher speed, such as an RPM over 1,000 or a delta of approximately 2,500 RPM.

The synchronizer engaged position illustrated in FIG. 6 demonstrates the clamping of the cones 446, 448, 452 as well as the engagement of the synchronizer collar 444 with the ring gear 352. Here the detents 462 are compressed as the synchronizer ring is slid axially toward the cantilevered ring gear 352. This position allows the unit to engage, thereby providing a torque to the rear wheels 144. In some situations the RDU 180, discussed above, will provide rotation to the pinion, which in turn provides rotation to the cantilevered ring gear 352. In these instances the synchronizer mechanism 440, with the even clamping force being applied, allows for the engagement by slowing or speeding up the rotation of the synchronizer collar 444 and the cantilevered ring gear 352. This situation may be present when the RDU 180 is a differential or an engaged RDU 180.

It should be known that the internal components of the clutch driven PTU 150 and the synchronizer driven PTU 450 are similar in design and function and vary only by the corresponding components of the clutch mechanism 340 and the synchronizer mechanism 440. The cantilevered aspect of the cantilevered ring gear 352 and cantilevered ring gear shaft 350 may be the same between each PTU 150, 450. The actuator 260, as discussed above, may be utilized in both types of PTU 150, 450. In a synchronized PTU 450, it functions the same way by axially sliding the synchronizer collar 444 into position, and the fork spring 376 helps to pop the synchronizer collar 444 and the cantilevered ring gear 352 into engagement. Thus, the ring gear cartridge assembly 256 may be interchangeable between both PTUs 150, 450. However, the synchronizer mechanism 440 is held axially against the cantilevered ring gear 352 during installation, due to the positioning of the cones 446, 448, 452 and the friction material 454, thereby preventing them from separating during final assembly with the main housing 252.

Figure 7:
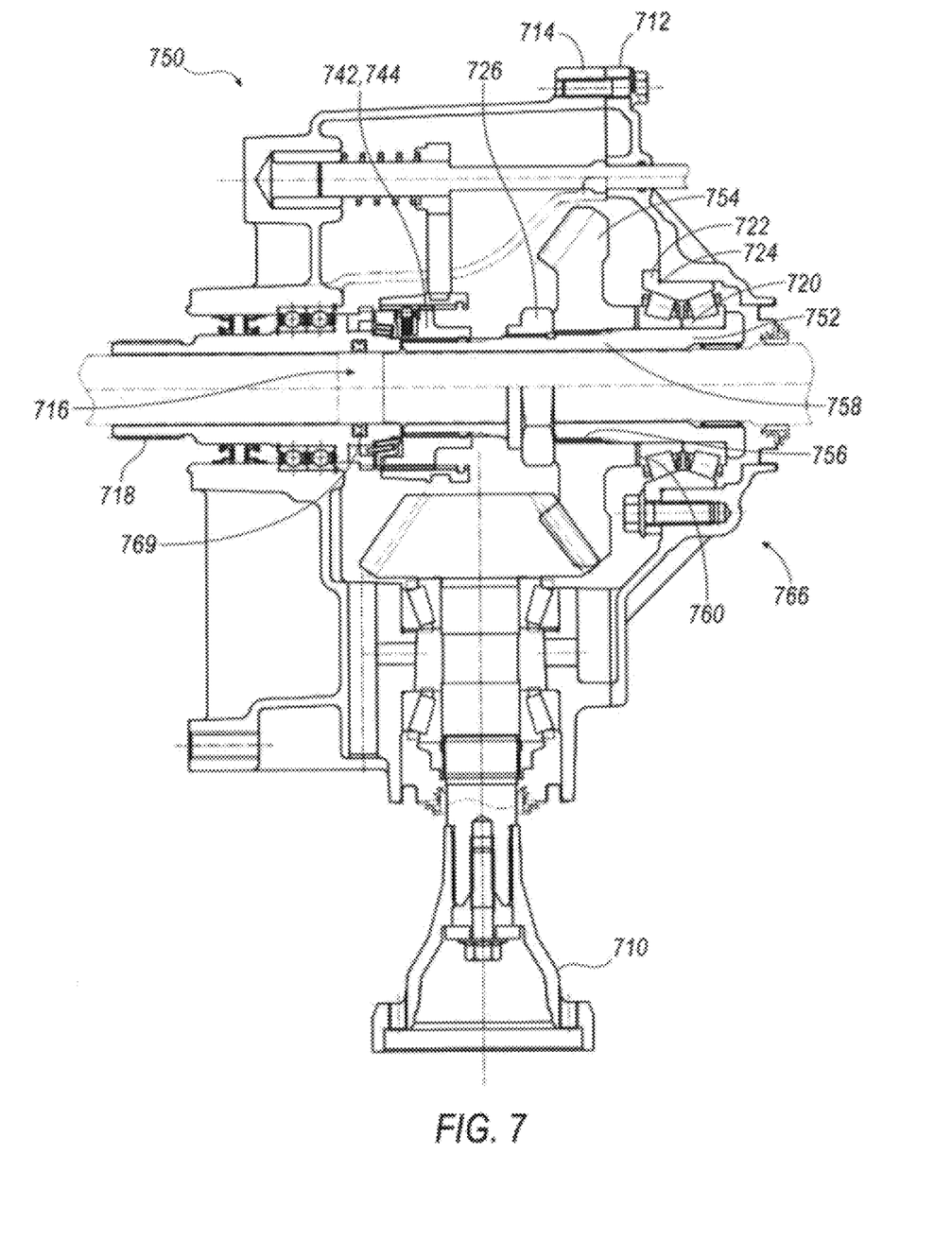
FIG. 7 illustrates a section view of an exemplary power transfer unit having an internal bearing cartridge with a two piece ring gear assembly retained by an internal ring nut configured adjacent the ring gear and an intermediate link shaft seal.
Figure 8:
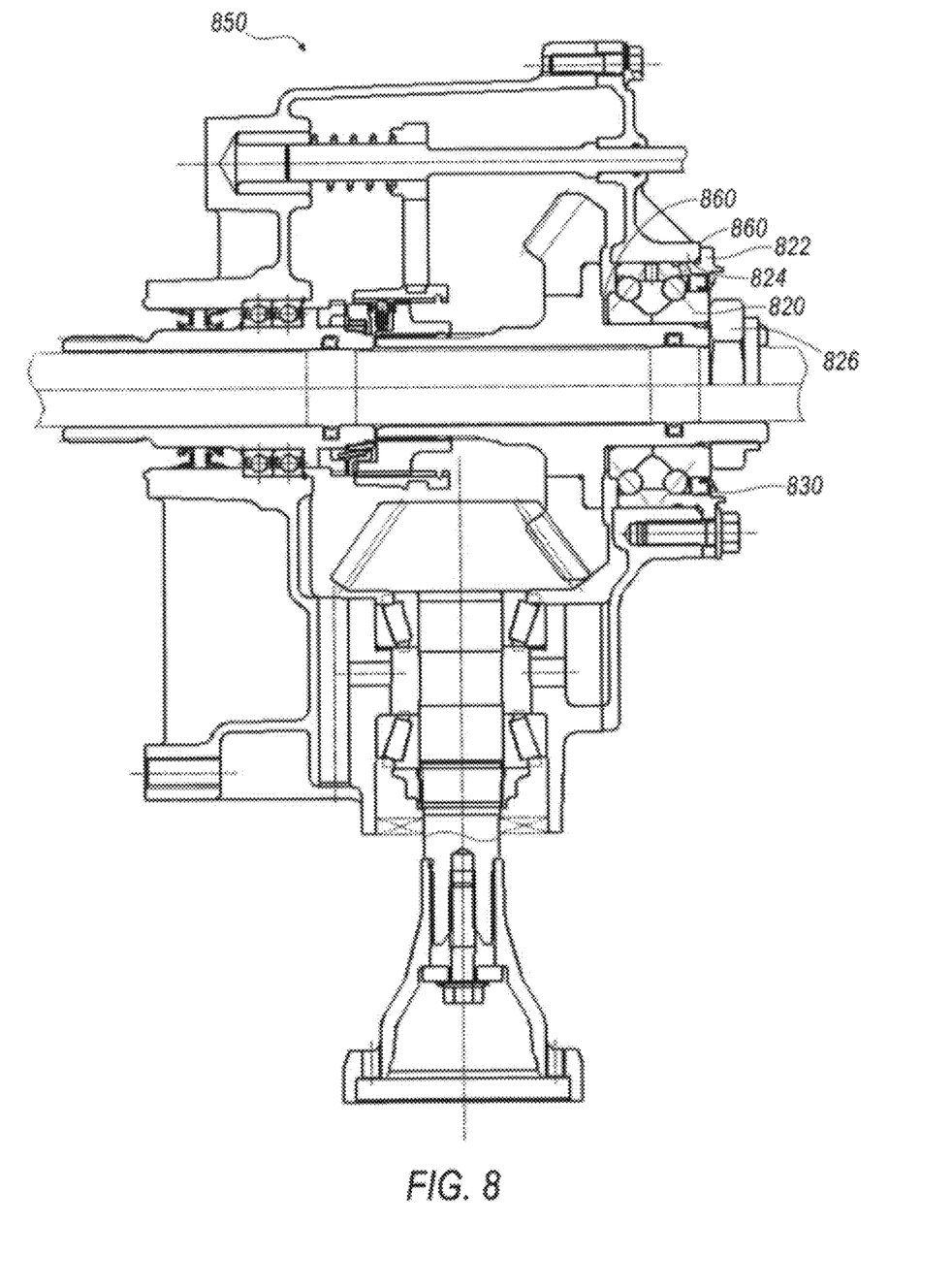
FIG. 8 illustrates a section view of an exemplary power transfer unit having an external bearing cartridge and integrated seal with a two piece ring gear assembly retained by an external nut and an intermediate link shaft seal.
Figure 9:
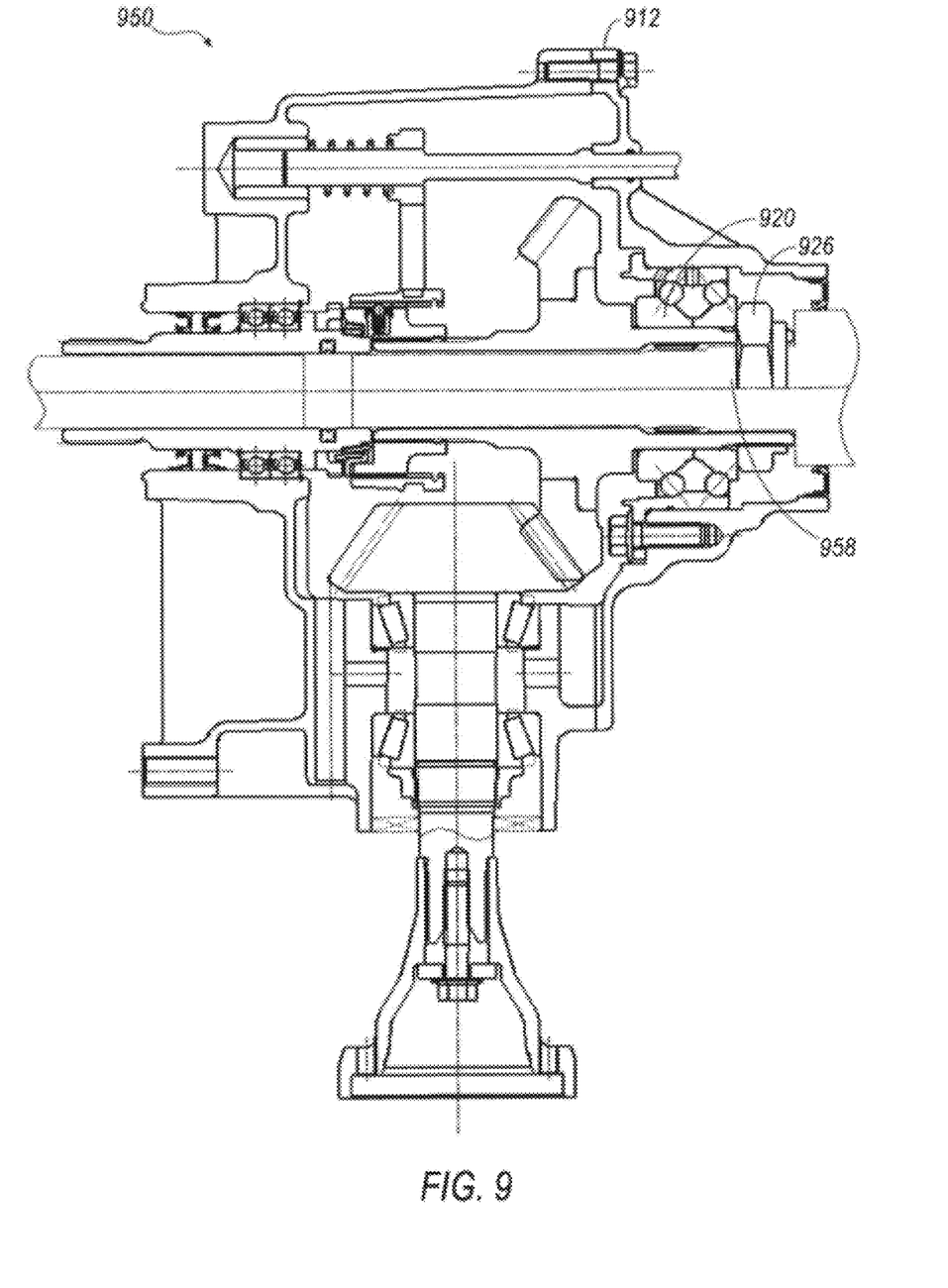
FIG. 9 illustrates a section view of an exemplary power transfer unit having an internal bearing cartridge with a two piece ring gear assembly retained by an internal nut configured adjacent the bearing cartridge and an intermediate link shaft seal.

Alternative configurations of the PTU 150, 450 are illustrated in FIGS. 7-9. The embodiments illustrated demonstrate different placement of the clutch 340 or the synchronizer mechanism 440. In this configuration, the synchronizer ring 744 or locking ring 742 is positioned on a first end of a cantilevered ring gear shaft 752. The synchronizer ring 744 and locking ring 742 functions similar to those discussed above, but they engage when slid axially towards the input shaft 718 and disengage when slid axially towards a cantilevered ring gear 754, which is affixed to the cantilevered ring gear shaft 752 at a mid-portion 758. Additionally, an inner shaft seal 764 may be used to seal against a shaft 716 that extends into the PTU.

Specifically, FIG. 7 illustrates a cantilevered PTU 750 including a bearing cartridge 720 wherein the bearing cartridge 720 provides the surface for supporting the cantilevered ring gear shaft 752. The bearing cartridge 720 may be a bolt on assembly with an integrated lip 722 that engages an inner surface 724 of the housing cover 712. A ring nut 726 is configured on the cantilevered ring gear shaft 752 between the cantilevered ring gear 754 and at least one of the synchronizer ring 744 and the clutch locking ring 742. The ring nut 726 is configured to clamp the cantilevered ring gear 754 and a ring sleeve 756 to the cantilevered ring gear shaft 752. The assembly may be shimmed 760 to set bearing preload separate from the positioning of the cantilevered ring gear 754. Thus, the shim 760 may be positioned between the bearing cartridge 720 and at least one of the cantilevered ring gear 754 and the inner surface 724 to create the bearing preload. Final preload is established upon assembly of the cantilevered ring cartridge assembly 766 and the main housing 714.

FIG. 8 illustrates an alternative PTU 850 embodiment similar to that of FIG. 7, but the positioning of the ring nut 826 and bearing cartridge 820 is moved to the exterior. Thus, a shim 860 may be configured between the bearing cartridge 820 and the cantilevered ring gear 854 or between an integrated lip 822 of the bearing cartridge 820 and a housing cover external surface 824. Additionally, the bearing cartridge 820 may include an integrated radial lip seal 830 to prevent the ingress of contaminants and the egress of fluids.

FIG. 9 illustrates an alternative PTU 950 embodiment similar to that of FIGS. 7 and 8, but the positioning of the ring nut 926 and bearing cartridge 920 is moved to the interior, such that the ring nut 926 clamps against the bearing cartridge 920 within the housing cover 912. The shim 960 placement, as previously discussed, may be the same as discussed with FIG. 7, but the nut is moved from the mid-area 758 to a second end 958.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A power transfer unit assembly for a vehicle, comprising:
   a main housing;
   a housing cover configured to mate with the main housing;
   a cantilevered ring gear assembly configured on the housing cover, wherein the cantilevered ring gear assembly includes at least one shim configured between a first bearing element and a cantilevered ring gear, at least one bearing cup and a crush sleeve configured between the first bearing element and a second bearing element and a nut configured to selectively apply a preload on a single side of the cantilevered ring gear; and
   at least one engagement mechanism configured to selectively engage and disengage the cantilevered ring gear assembly.

2. The power transfer unit assembly according to claim 1, wherein the housing cover and cantilevered ring gear assembly are configured as a ring gear cartridge assembly configured to be mounted to the main housing as a single unit.

3. The power transfer unit assembly according to claim 1, wherein the cantilevered ring gear assembly includes the cantilevered ring gear configured on a ring gear shaft, the ring gear shaft is supported in the housing cover by at least the first and second bearing elements.

4. The power transfer unit assembly according to claim 3, wherein a bearing preload is configured prior to mating the housing cover to the main housing.

5. The power transfer unit assembly according to claim 1, further comprising an input shaft configured to transmit torque from a vehicle transmission to the cantilevered ring gear assembly.

6. The power transfer unit assembly according to claim 1, wherein the engagement mechanism is a clutch mechanism having a sliding collar.

7. The power transfer unit assembly according to claim 1, wherein the engagement mechanism is a synchronizing mechanism, the synchronizing mechanism includes a collar configured to engage at least one cone and at least one friction element with the cantilevered ring gear assembly.

8. The power transfer unit assembly according to claim 1, wherein a portion of the engagement mechanism is moved axially by an actuator, the actuator includes a shift fork that directly connects the engagement mechanism to the actuator.

9. The power transfer unit assembly according to claim 1, wherein a portion of the engagement mechanism is axially fixed to the housing cover through a connection with the cantilevered ring gear assembly.

10. The power transfer unit assembly according to claim 1, wherein at least a portion of the engagement mechanism is axially slidable for selective engagement of the cantilevered ring gear assembly and an input shaft, the input shaft configured to transmit torque from a vehicle transmission.

11. The power transfer unit assembly according to claim 10, further comprising a propeller shaft configured to transmit torque to a second power transfer unit.

12. The power transfer unit assembly according to claim 1, further comprising an actuation mechanism extending through the housing cover and configured to one of engage and disengage the engagement mechanism, the actuation mechanism is one of automatic and manual.

13. The power transfer unit assembly according to claim 1, further comprising a pinion gear engaged to the cantilevered ring gear configured in the cantilevered ring gear assembly, the pinion gear is configured to transmit torque to a propeller shaft as a transmission provides torque to at least one wheel on a vehicle.

14. A power transfer unit assembly for a vehicle, comprising:
    a torque transmitting input shaft configured in a housing on a first side;
    a cantilevered ring gear configured on an opposing side of the housing, wherein a ring gear shaft extends from a surface of the cantilevered ring gear at a ring gear center point, the ring gear shaft is supported in the housing by at least one ring gear nut and a bearing element on the opposing side of the housing, the at least one ring gear nut is configured to selectively apply a preload to the bearing element, at least one shim is configured between the bearing element and the cantilevered ring gear, a second bearing element supports the ring near shaft in the housing, a crush sleeve is configured between the bearing element and the second bearing element; and at least one engagement mechanism configured to selectively engage and disengage the cantilevered ring gear with the torque transmitting input shaft.

15. The power transfer unit assembly according to claim 14, wherein the engagement mechanism is a clutching mechanism having a sliding collar, the sliding collar configured to selectively engage a surface of the input shaft and a surface of the cantilevered ring gear, the sliding collar is configured to receive a shift fork interconnected with a drive mechanism and a biasing element to transmit torque from the input shaft to the cantilevered ring gear.

16. The power transfer unit assembly according to claim 14, wherein the engagement mechanism is a synchronizing mechanism, the synchronizing mechanism includes a shift collar, a plurality of shift cones and a plurality of friction elements, the shift collar rotatively fixed to the input shaft at a first end and configured to selectively engage the cantilevered ring gear at a second end, wherein plurality of cones are configured to apply a force to the plurality of friction elements to synchronize a rotation of the input shaft to a rotation of the cantilevered ring gear.

* * * * *

UNITED STATES PATENT AND TRADEMARK OFFICE
CERTIFICATE OF CORRECTION

PATENT NO. : 9,120,374 B2  Page 1 of 1
APPLICATION NO. : 13/398236
DATED : September 1, 2015
INVENTOR(S) : Brent Michael Peura et al.

It is certified that error appears in the above-identified patent and that said Letters Patent is hereby corrected as shown below:

In the claims

Column 13, line 1, claim 14 after "ring" delete "near" and insert --gear--

Signed and Sealed this
Seventh Day of June, 2016

Michelle K. Lee
*Director of the United States Patent and Trademark Office*